US010655586B2

(12) United States Patent
Sato

(10) Patent No.: US 10,655,586 B2
(45) Date of Patent: May 19, 2020

(54) RUNNING CONTROL APPARATUS AND RUNNING CONTROL SYSTEM

(71) Applicant: HITACHI AUTOMOTIVE SYSTEMS, LTD., Hitachinaka-shi, Ibaraki (JP)

(72) Inventor: Seiichi Sato, Hitachinaka (JP)

(73) Assignee: Hitachi Automotive Systems, Ltd., Ibaraki (JP)

(*) Notice: Subject to any disclaimer, the term of this patent is extended or adjusted under 35 U.S.C. 154(b) by 1072 days.

(21) Appl. No.: 14/781,103

(22) PCT Filed: Jan. 24, 2014

(86) PCT No.: PCT/JP2014/051435
§ 371 (c)(1),
(2) Date: Sep. 29, 2015

(87) PCT Pub. No.: WO2014/156255
PCT Pub. Date: Oct. 2, 2014

(65) Prior Publication Data
US 2016/0061172 A1 Mar. 3, 2016

(30) Foreign Application Priority Data
Mar. 29, 2013 (JP) ................................. 2013-070936

(51) Int. Cl.
F02N 11/08 (2006.01)
B60W 40/04 (2006.01)
(Continued)

(52) U.S. Cl.
CPC ......... F02N 11/0814 (2013.01); B60W 30/16 (2013.01); B60W 40/04 (2013.01);
(Continued)

(58) Field of Classification Search
CPC ............. F02N 11/0814; F02N 11/0837; F02N 2200/125; G05B 15/02; B60W 30/16;
(Continued)

(56) References Cited

U.S. PATENT DOCUMENTS 6,067,031 A * 5/2000 Janky .................... G01S 5/0072
180/169
6,281,808 B1 * 8/2001 Glier ...................... G07B 15/06
340/916

(Continued)

FOREIGN PATENT DOCUMENTS

EP 1564703 A1 8/2005
JP 2001289087 A 10/2001
(Continued)

OTHER PUBLICATIONS

European Patent Office Action dated Oct. 28, 2016 for Application No. 14774095.5 (5 pages).

Primary Examiner — Sizo B Vilakazi
Assistant Examiner — Brian R Kirby
(74) Attorney, Agent, or Firm — Volpe & Koenig, P.C.

(57) ABSTRACT

A running control apparatus for improving fuel efficiency by enabling automatic engine stop includes: a moving object detection unit for detecting a moving object moving in a direction crossing a direction of travel of own vehicle on the basis of an acquired image acquired from an image pickup apparatus; an acceleration calculation unit for calculating acceleration of the moving object; a moving object crossing intention determination unit for determining, on the basis of the acceleration of the moving object, whether or not the moving object intends to cross an intersection ahead of the own vehicle in the direction crossing the direction of the travel of the own vehicle before the own vehicle crosses the intersection; and automatic engine stop decision unit for deciding whether the own vehicle automatically stops an
(Continued)

engine during running on the basis of a result of determination of the moving object crossing intention determination unit.

10 Claims, 5 Drawing Sheets

(51) Int. Cl.
    *F02D 29/02*     (2006.01)
    *B60W 30/16*     (2020.01)
    *F02D 17/00*     (2006.01)
    *G05B 15/02*     (2006.01)

(52) U.S. Cl.
    CPC ............ *F02D 17/00* (2013.01); *F02D 29/02* (2013.01); *F02N 11/0837* (2013.01); *G05B 15/02* (2013.01); *B60W 2550/10* (2013.01); *B60W 2550/20* (2013.01); *B60W 2710/06* (2013.01); *F02N 2200/125* (2013.01); *Y02T 10/48* (2013.01)

(58) Field of Classification Search
    CPC ............ B60W 40/04; B60W 2550/20; B60W 2710/06; B60W 2550/10; F02D 29/02; F02D 17/00; Y02T 10/48
    See application file for complete search history.

(56) References Cited

U.S. PATENT DOCUMENTS

| | | | | |
|---|---|---|---|---|
| 6,324,465 B1* | 11/2001 | Teramura | ............ | B60K 31/0008 180/170 |
| 6,430,494 B1* | 8/2002 | Inoue | ................ | B60K 31/0008 340/435 |
| 6,725,145 B1* | 4/2004 | Takahashi | ......... | B60K 31/0075 340/438 |
| 6,830,534 B2* | 12/2004 | Seibertz | .................. | B60K 6/48 477/92 |
| 7,035,735 B2* | 4/2006 | Knoop | .................... | B60T 7/22 180/169 |
| 7,079,940 B2* | 7/2006 | Scholt | ................ | F02N 11/0818 123/179.15 |
| 7,443,314 B2* | 10/2008 | Konishi | ................ | B60W 40/04 340/435 |
| 7,515,056 B2* | 4/2009 | Knoop | .................... | B60Q 9/008 180/272 |
| 7,561,180 B2* | 7/2009 | Koike | ................... | B60Q 1/484 340/903 |
| 8,296,030 B2* | 10/2012 | Luo | ..................... | F02N 11/0837 701/112 |
| 8,532,843 B2* | 9/2013 | Nagura | ............... | F02N 11/0837 123/179.4 |
| 9,151,263 B2* | 10/2015 | Hrovat | ................ | F02N 11/0837 |
| 9,249,742 B2* | 2/2016 | Sangameswaran | ........................ | F02N 11/0837 |
| 2001/0044692 A1* | 11/2001 | Isogai | ................ | B60K 31/0008 701/96 |
| 2002/0054210 A1* | 5/2002 | Glier | ....................... | G08G 1/04 348/149 |
| 2002/0148424 A1* | 10/2002 | Wakabayashi | ...... | F02N 11/0837 123/179.4 |
| 2003/0076981 A1* | 4/2003 | Smith | ................... | B60R 21/013 382/104 |
| 2004/0054513 A1* | 3/2004 | Laird | ..................... | G07B 15/06 703/8 |
| 2004/0167702 A1* | 8/2004 | Isogai | ................... | B60T 17/221 701/96 |
| 2005/0046597 A1* | 3/2005 | Hutchison | .............. | G01S 13/92 340/917 |
| 2005/0201590 A1 | 9/2005 | Kudo | | |
| 2006/0142121 A1* | 6/2006 | Moriya | ............... | F02N 11/0833 477/199 |
| 2006/0212212 A1* | 9/2006 | Akasaka | ............. | F02D 41/0002 701/112 |
| 2007/0035416 A1* | 2/2007 | Tanaka | ..................... | B60T 7/18 340/906 |
| 2007/0215115 A1* | 9/2007 | Hazama | ................ | F02D 33/003 123/458 |
| 2009/0164109 A1* | 6/2009 | Maruyama | ........... | B60W 30/16 701/116 |
| 2009/0248270 A1 | 10/2009 | Sekiguchi | | |
| 2010/0007523 A1* | 1/2010 | Hatav | .................... | G01C 21/26 340/901 |
| 2010/0070128 A1* | 3/2010 | Johnson | .......... | G08G 1/096783 701/31.4 |
| 2010/0125402 A1* | 5/2010 | Bansal | ..................... | G08G 1/07 701/117 |
| 2010/0191446 A1* | 7/2010 | McDonald | ......... | F02N 11/0837 701/113 |
| 2011/0071746 A1* | 3/2011 | O'Connor Gibson | ...................... | F02N 11/0837 701/101 |
| 2011/0153119 A1* | 6/2011 | Lee | ..................... | F02N 11/0837 701/2 |
| 2012/0016573 A1* | 1/2012 | Ellis | ................... | B60K 31/0008 701/112 |
| 2012/0016581 A1* | 1/2012 | Mochizuki | ............. | G08G 1/161 701/301 |
| 2012/0029730 A1* | 2/2012 | Nagura | ............... | F02N 11/0837 701/2 |
| 2012/0078466 A1* | 3/2012 | Natori | ..................... | B60Q 1/52 701/36 |
| 2012/0095670 A1* | 4/2012 | Piggott | ................... | F02D 17/04 701/112 |
| 2012/0132176 A1* | 5/2012 | Sawada | ............... | F02N 11/0837 123/339.14 |
| 2012/0179357 A1* | 7/2012 | Phillips | .................. | F02D 17/02 701/112 |
| 2012/0274481 A1* | 11/2012 | Ginsberg | ......... | G08G 1/096775 340/905 |
| 2013/0124071 A1* | 5/2013 | Engel | .................. | F02N 11/0837 701/112 |
| 2013/0211686 A1* | 8/2013 | Shono | .................. | B60K 6/445 701/70 |
| 2013/0297124 A1* | 11/2013 | Be | ........................... | G06F 17/00 701/22 |
| 2013/0304358 A1* | 11/2013 | Matsunaga | ............ | F02D 41/00 701/110 |
| 2014/0074330 A1* | 3/2014 | Malone | ................ | B60W 10/06 701/22 |
| 2014/0136041 A1* | 5/2014 | Malone | ................ | B60W 10/06 701/22 |
| 2014/0222280 A1* | 8/2014 | Salomonsson | ........... | B60T 7/22 701/28 |
| 2014/0222326 A1* | 8/2014 | Sato | ...................... | B60W 10/18 701/301 |
| 2014/0257637 A1* | 9/2014 | Sangameswaran | ......................... | B60W 30/095 701/41 |
| 2014/0257677 A1* | 9/2014 | Sangameswaran | ..... | F02D 45/00 701/112 |
| 2014/0277989 A1* | 9/2014 | Krueger | .............. | B60W 10/184 701/96 |
| 2014/0297107 A1* | 10/2014 | Wagner | ................ | B60W 30/06 701/36 |
| 2014/0358392 A1* | 12/2014 | Shimizu | ................ | G08G 1/166 701/70 |
| 2015/0266473 A1* | 9/2015 | Hayasaka | ............ | B60W 30/09 701/70 |

FOREIGN PATENT DOCUMENTS

| | | | | |
|---|---|---|---|---|
| JP | 2010039603 | A | * | 2/2010 |
| JP | 2010108180 | A | * | 5/2010 |
| JP | 2010-216421 | A | | 9/2010 |
| JP | 2011169301 | A | * | 9/2011 |
| JP | 2012031818 | A | | 2/2012 |
| KR | 100906870 | B1 | * | 7/2009 |

(56) References Cited

FOREIGN PATENT DOCUMENTS

\* cited by examiner

[FIG. 1]
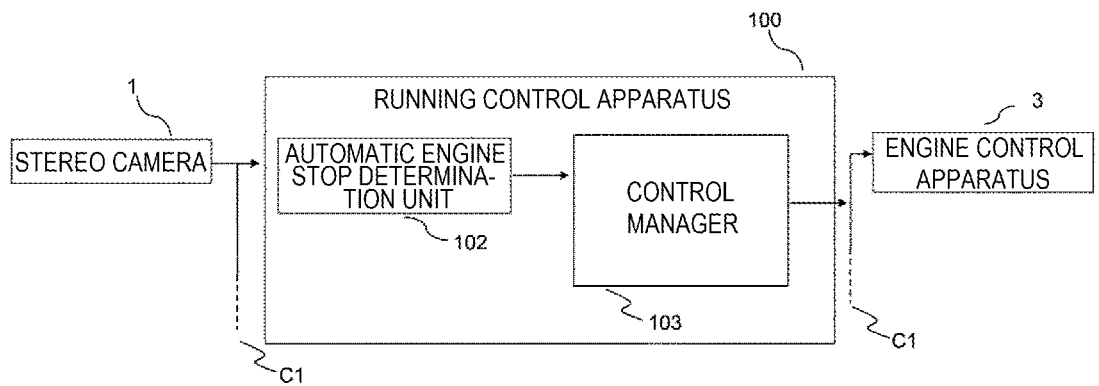
[FIG. 2]
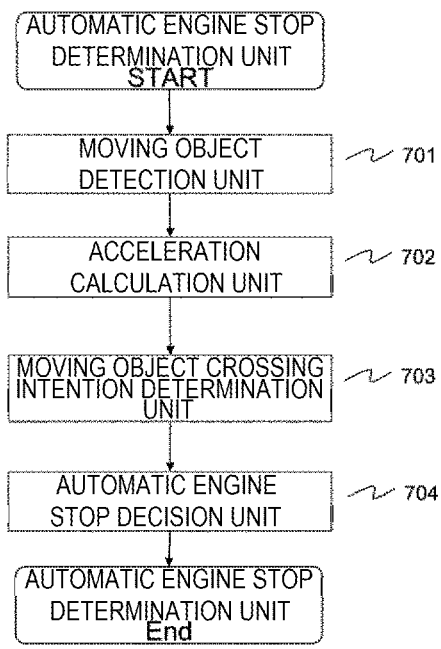

[FIG. 3]
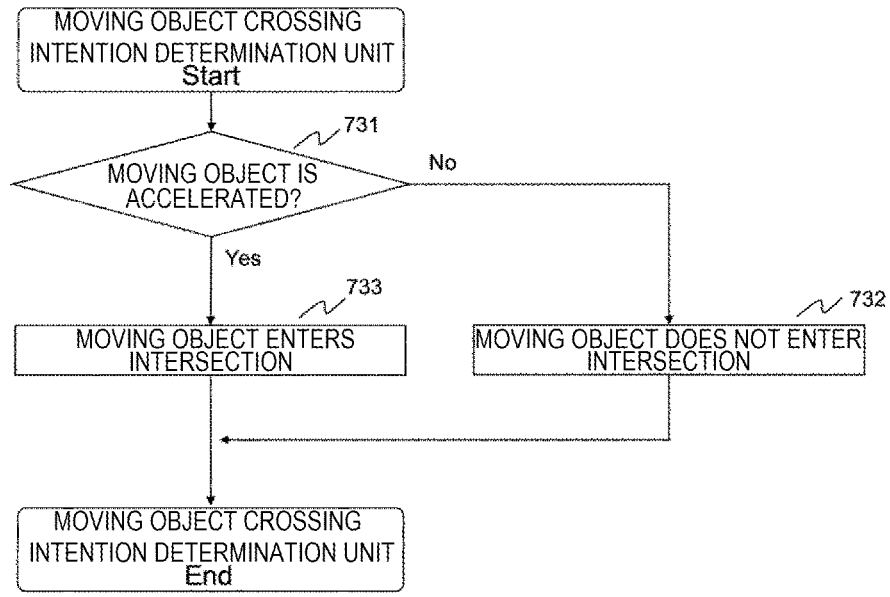
[FIG. 4]
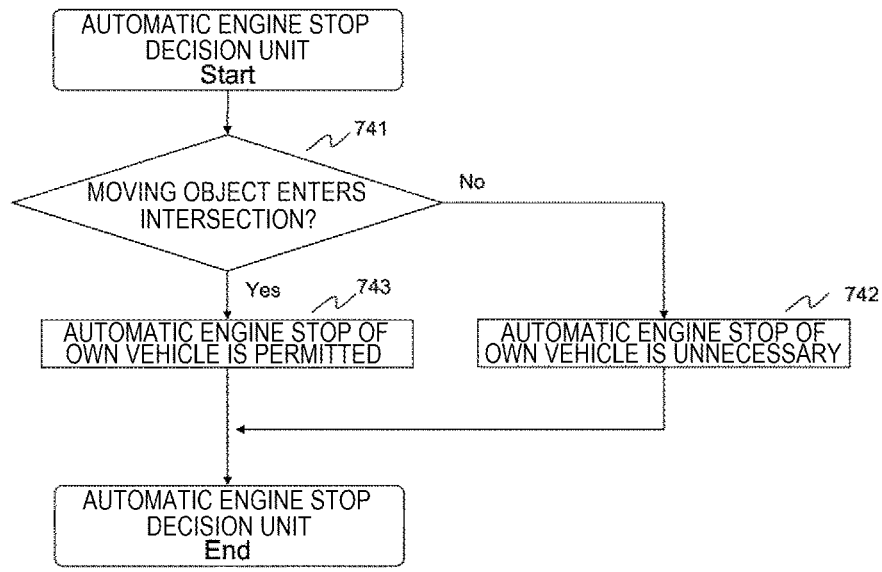

[FIG. 5]
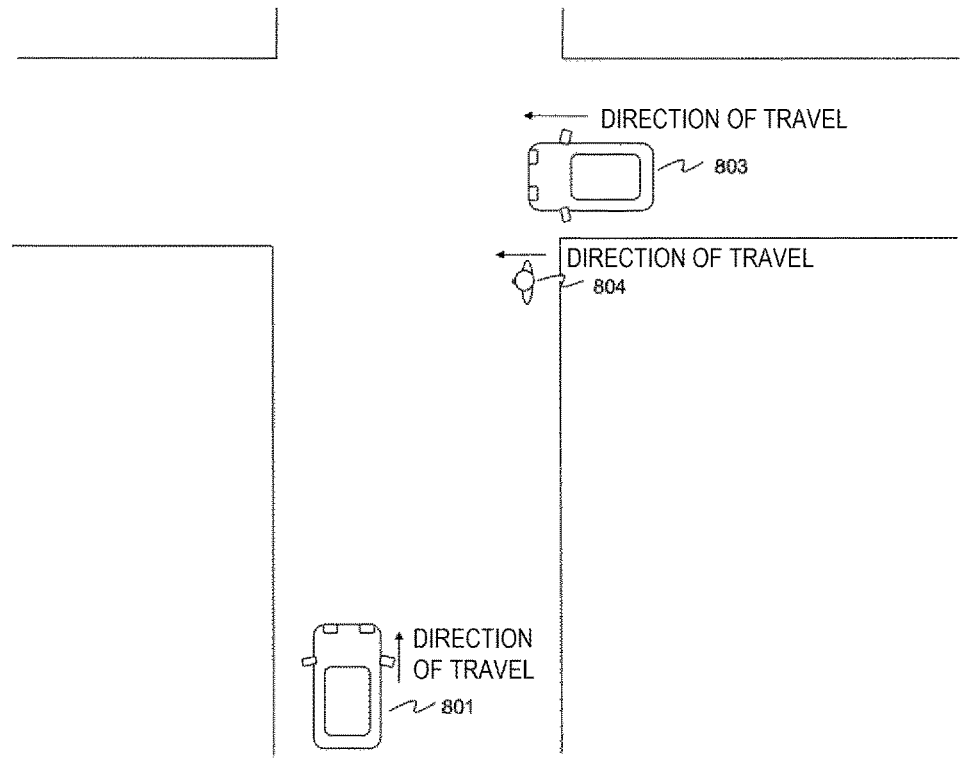
[FIG. 6]
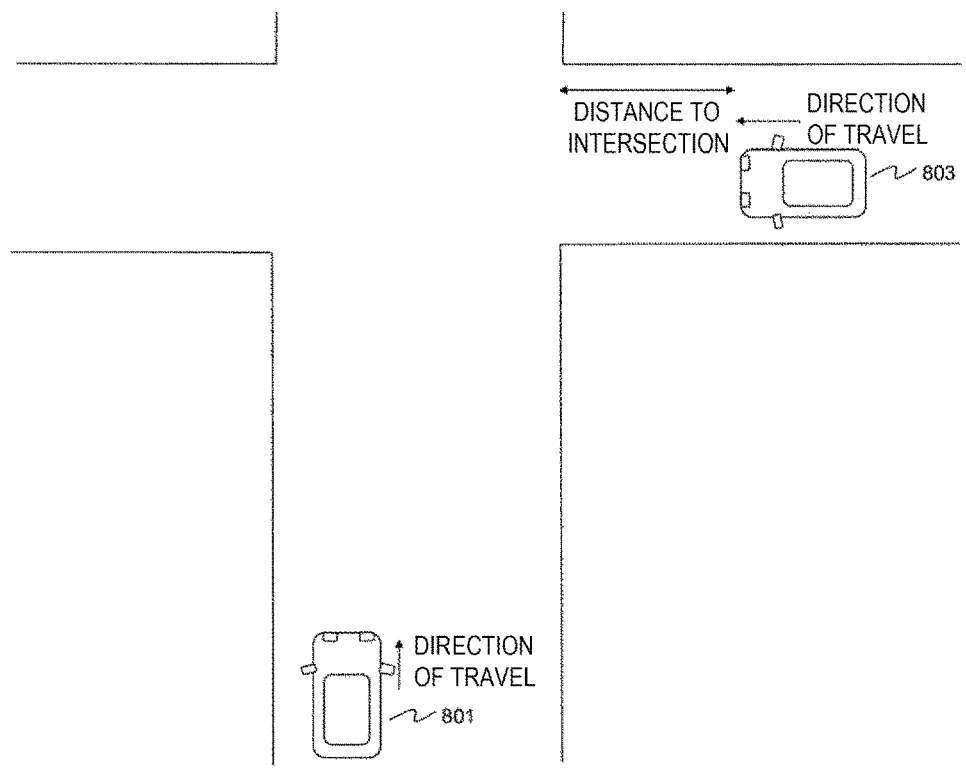

[FIG. 7]
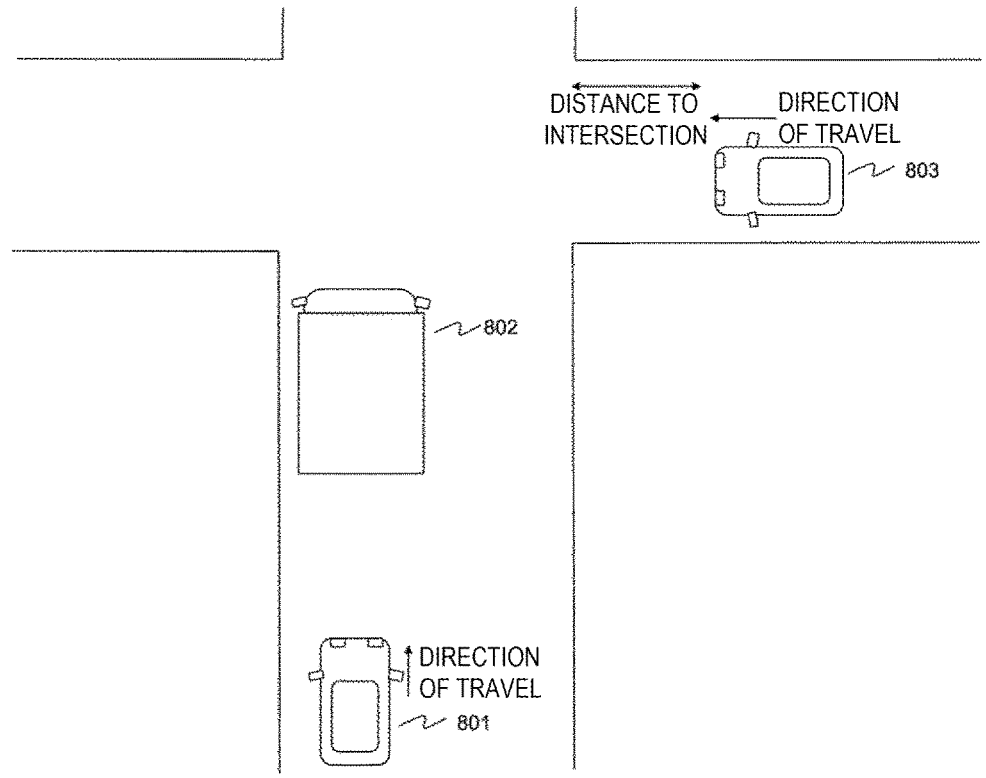
[FIG. 8]
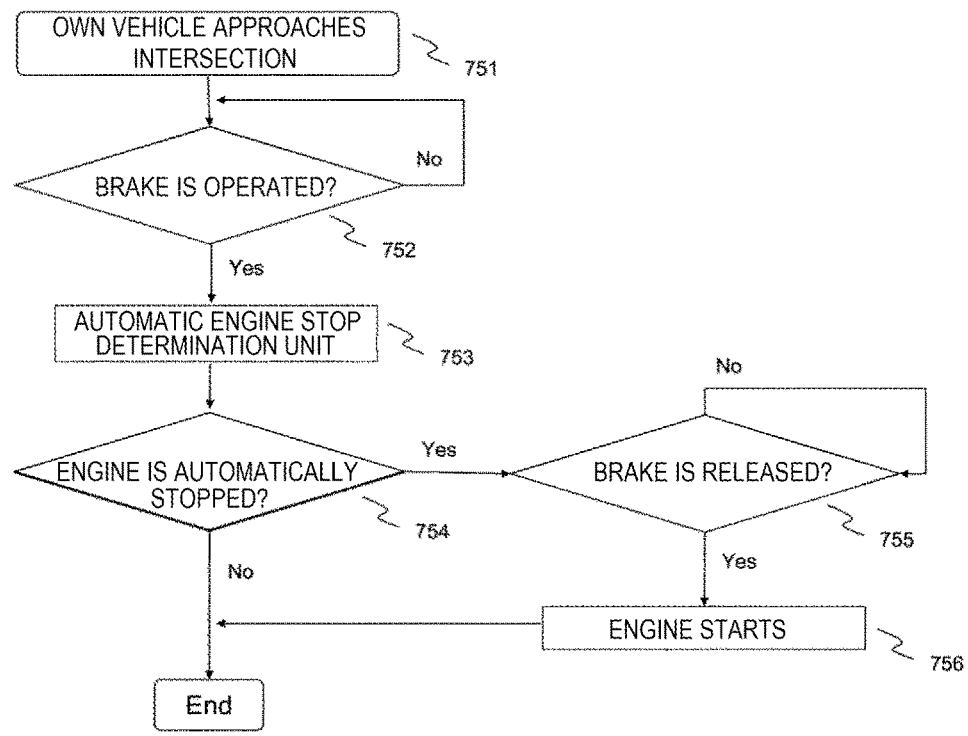

[FIG. 9]
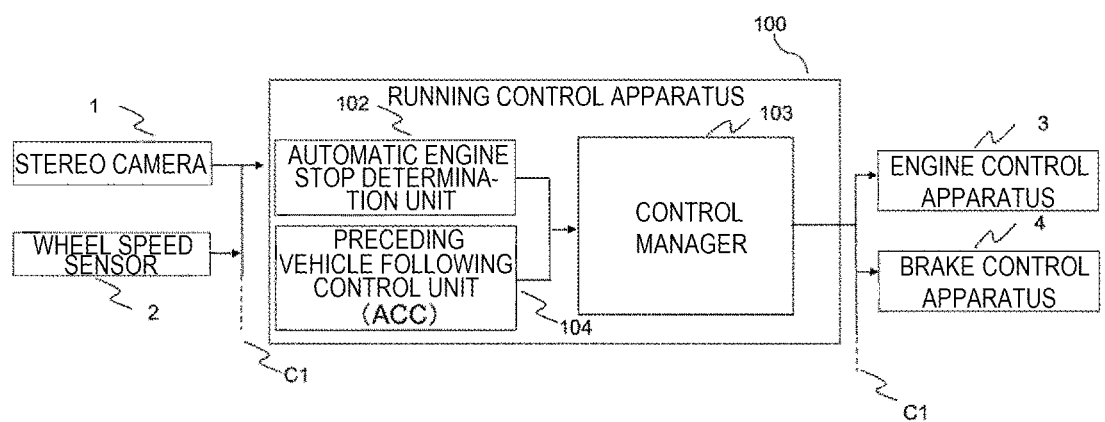

RUNNING CONTROL APPARATUS AND RUNNING CONTROL SYSTEM

TECHNICAL FIELD

The present invention relates to a running control apparatus and a running control system, each of which performs control to automatically stop an engine of own vehicle.

BACKGROUND ART

In recent years, there has been proposed a system for automatically stopping an engine when a vehicle is stopped, or immediately before the vehicle is stopped, in order to improve fuel efficiency.

In control to automatically stop an engine, there is proposed an apparatus for calculating a passing time on the basis of a position and speed of a crossing vehicle or a pedestrian and calculating a waiting time of own vehicle after temporary stop, thereby automatically stopping an engine (see PTL 1).

CITATION LIST

Patent Literature

PTL 1: JP-A-2010-216421

SUMMARY OF INVENTION

Technical Problems

In the case where automatic engine stop control is performed with the use of an external environment recognition device including a camera and a radar unit, a timing at which a lighting signal is changed cannot be recognized in the following cases: a case where forward visibility of own vehicle is blocked by a preceding vehicle having a high vehicle height such as a truck, and the color of a traffic signal cannot be recognized; and a case where recognition of lighting color of a traffic signal is difficult due to breakdown of a traffic signal or bad weather. Therefore, necessity/unnecessity to stop the own vehicle cannot be determined and optimal control of necessity/unnecessity of automatic engine stop cannot be performed.

An object of the invention is to improve fuel efficiency by enabling automatic engine stop necessity/unnecessity determination, regardless of infrastructure.

Solution to Problems

In order to solve the problems, a running control apparatus of the invention includes: a moving object detection unit for detecting a moving object moving in a direction crossing a direction of travel of own vehicle on the basis of an acquired image acquired from an image pickup apparatus; an acceleration calculation unit for calculating acceleration of the moving object; a moving object crossing intention determination unit for determining, on the basis of the acceleration of the moving object, whether or not the moving object intends to cross an intersection ahead of the own vehicle in the direction crossing the direction of the travel of the own vehicle before the own vehicle crosses the intersection; and an automatic engine stop decision unit for deciding whether or not the own vehicle should automatically stop an engine during running on the basis of a result of determination of the moving object crossing intention determination unit.

Further, a running control system of the invention includes: a stereo camera for generating a distance image on the basis of two acquired images; automatic engine stop determination unit for detecting a moving object moving in a direction crossing a direction of travel of own vehicle on the basis of the distance image and determining whether or not the own vehicle should automatically stop an engine during running; and a control manager for generating a torque command value and a liquid pressure command value on the basis of a result of determination of the automatic engine stop determination unit, in which the automatic engine stop determination unit includes a moving object detection unit for detecting the moving object moving in the direction crossing the direction of the travel of the own vehicle on the basis of the acquired image, an acceleration calculation unit for calculating acceleration of the moving object, a moving object crossing intention determination unit for determining, on the basis of the acceleration of the moving object and a distance between the moving object and an intersection, whether or not the moving object intends to cross the intersection ahead of the own vehicle in the direction crossing the direction of the travel of the own vehicle before the own vehicle crosses the intersection, and an automatic engine stop decision unit for deciding whether or not the own vehicle should automatically stop an engine during running on the basis of a result of determination of the moving object crossing intention determination unit.

Advantageous Effects of Invention

According to the invention, it is possible to improve fuel efficiency by enabling automatic engine stop determination, regardless of infrastructure such as lighting color of a traffic signal.

BRIEF DESCRIPTION OF DRAWINGS

FIG. 1 shows an example of a system configuration including a running control apparatus according to the invention.

FIG. 2 shows a flow of an automatic engine stop determination unit of a running control apparatus of the invention.

FIG. 3 shows a flow of a moving object crossing intention determination unit of a running control apparatus of the invention.

FIG. 4 shows a flow of an automatic engine stop decision unit of a running control apparatus of the invention.

FIG. 5 shows an example of an intersection to which a running control apparatus of the invention is applied.

FIG. 6 shows another example of an intersection to which a running control apparatus of the invention is applied.

FIG. 7 shows another example of an intersection to which a running control apparatus of the invention is applied.

FIG. 8 shows a control flow from automatic engine stop of the invention to restart.

FIG. 9 shows another example of a system configuration including a running control apparatus according to the invention.

DESCRIPTION OF EMBODIMENTS

FIG. 1 shows an example of a configuration of a running control apparatus of the invention.

A vehicle includes a stereo camera 1 for capturing an image of an external environment in a direction of travel of the vehicle, and output (acquired image) of the stereo camera 1 is transmitted to a running control apparatus 100. The running control apparatus 100 includes an automatic engine stop decision unit 102 and a control manager 103.

The automatic engine stop decision unit 102 generates an automatic engine stop necessity/unnecessity signal on the basis of the acquired image acquired in the stereo camera 1.

The automatic engine stop necessity/unnecessity signal generated in the automatic engine stop decision unit 102 is sent to an engine control apparatus 3 via CAN communication through the control manager 103 which manages signals for controlling an external actuator, an engine, and the like.

First, as shown in FIG. 2, in the automatic engine stop determination unit 102, a moving object detection unit 701 detects a moving object moving in a direction crossing a direction of travel of own vehicle on the basis of an acquired image by using a method such as an optical flow.

Then, an acceleration calculation unit 702 calculates acceleration of the moving object moving in the direction crossing the direction of the travel of the own vehicle.

Thereafter, a moving object crossing intention determination unit 703 determines, on the basis of the acceleration of the moving object, whether or not the moving object moving in the direction crossing the direction of the travel of the own vehicle intends to cross an intersection ahead of the own vehicle and finally determines whether or not the own vehicle needs to stop.

An automatic engine stop decision unit 704 generates an automatic engine stop necessity/unnecessity signal on the basis of necessity/unnecessity to stop the own vehicle.

Note that whether or not the moving object moving in the direction crossing the direction of the travel of the own vehicle crosses the intersection before the own vehicle crosses the intersection is determined by the moving object crossing intention determination unit 703 on the basis of positive/negative acceleration of the moving object which is calculated by the acceleration calculation unit 702 in Step 731 of FIG. 3. In the case where it is determined in Step 731 that the moving object is accelerating (in the case of Yes), it is determined in Step 733 that the moving object enters the intersection, i.e., the moving object crosses the intersection. In the case where it is determined in Step 731 that the moving object is not accelerating (in the case of No), it is determined in Step 732 that the moving object does not enter the intersection, i.e., the moving object does not cross the intersection.

Whether automatic stop of an engine of the own vehicle is permitted or is determined to be unnecessary, which is decided by the automatic engine stop decision unit 704, is determined based on whether or not the moving object moving in the direction crossing the direction of the travel of the own vehicle enters the intersection before the own vehicle enters the intersection, which is determined by the moving object crossing intention determination unit 703 in Step 741 of FIG. 4. In the case where it is determined in Step 741 that the moving object enters the intersection (in the case of Yes), automatic engine stop of the own vehicle is permitted in Step 743. In the case where it is determined in Step 741 that the moving object does not enter the intersection (in the case of No), the automatic engine stop of the own vehicle is determined to be unnecessary in Step 742.

For example, as illustrated in FIG. 5, there is a case where own vehicle 801 is running toward an intersection and the stereo camera 1 can recognize that a crossing vehicle 803 and a pedestrian 804 are moving. Herein, the stereo camera 1 can obtain not only distance information caused by parallax of two camera images but also hue information, and therefore it is possible to easily recognize a type of object such as a vehicle, bicycle, or a pedestrian.

Because the crossing vehicle 803 and the pedestrian 804 are moving, it is possible to detect positions thereof on the basis of an acquired image and calculate speed thereof by calculating a time series of the positions.

It is possible to calculate acceleration of the crossing vehicle 803 or the pedestrian 804 by differentiating the speed of the crossing vehicle 803 or the pedestrian 804 by an image pickup timing cycle of the stereo camera 1. In the case where the acceleration of the crossing vehicle or the pedestrian has a negative value, it means that the object is decelerating, whereas, in the case where the acceleration has a positive value, it means that the object is accelerating. That is, deceleration of the crossing vehicle or the pedestrian means that the crossing vehicle or the pedestrian does not intend to cross the intersection, whereas acceleration thereof means that the crossing vehicle or the pedestrian may enter the intersection.

In the case where the acceleration of the crossing vehicle 803 or the pedestrian 804 has a positive value, it is found that the crossing vehicle 803 or the pedestrian 804 crosses the intersection and it is considered that the own vehicle 801 stops for a long time (which is predetermined time, for example, about 5 seconds) because of a red signal or temporary stop in a direction of travel of the own vehicle 801. Therefore, it is possible to permit automatic engine stop of the own vehicle 801.

Meanwhile, in the case where the acceleration of the crossing vehicle 803 or the pedestrian 804 has a negative value, it is found that the crossing vehicle 803 or the pedestrian 804 stops because of a red signal or temporary stop in a direction of travel thereof, and it can be determined that the traffic signal is blue or there is a through street in the direction of the travel of the own vehicle and it is considered that the own vehicle 801 does not stop or, even if the own vehicle 801 stops, the own vehicle 801 immediately moves (for example, within 5 seconds). Therefore, the automatic engine stop of the own vehicle 801 is determined to be unnecessary.

Although the above description is a case where the necessity/unnecessity of the automatic engine stop is determined based only on the acceleration of the crossing vehicle, accuracy of automatic engine stop necessity/unnecessity decision is improved by considering a distance between an intersection and the crossing vehicle.

As illustrated in FIG. 6, in the case where the crossing vehicle 803 is running toward an intersection, the own vehicle 801 can detect the acceleration of the crossing vehicle 803 and a distance between the crossing vehicle 803 and the intersection with the use of the stereo camera 1 provided therein.

Table 1 shows necessity/unnecessity of automatic engine stop under conditions of the acceleration of the crossing vehicle 803 and the distance between the crossing vehicle 803 and the intersection.

TABLE 1

| Crossing vehicle | Distance between intersection and crossing vehicle | Automatic engine stop ON/OFF |
| --- | --- | --- |
| Acceleration | Short | ON |
|  | Long | ON |

TABLE 1-continued

| Crossing vehicle | Distance between intersection and crossing vehicle | Automatic engine stop ON/OFF |
|---|---|---|
| Deceleration | Short | ON |
| | Long | OFF |

In the case where the crossing vehicle 803 is accelerating, the own vehicle permits the automatic engine stop to wait for the crossing vehicle 803 to pass therethrough, regardless of the distance between the crossing vehicle 803 and the intersection.

In the case there the crossing vehicle 803 is decelerating and the distance between the crossing vehicle 803 and the intersection is short (immediately before the crossing vehicle enters the intersection), i.e., in the case where the distance is equal to or less than a predetermined value, it is considered that the crossing vehicle 803 enters the intersection without stopping. Therefore, the automatic engine stop is permitted.

In the case where the crossing vehicle 803 is decelerating but the distance between the crossing vehicle 803 and the intersection is long (about 5 seconds before the crossing vehicle enters the intersection, which is calculated based on the distance between the crossing vehicle and the intersection and the speed of the crossing vehicle), i.e., in the case where the distance is larger than the predetermined value, the automatic engine stop is determined to be unnecessary.

FIG. 7 shows a situation in which a preceding vehicle 802 exists and the crossing vehicle 803 can be recognized by the stereo camera. In the case where the preceding vehicle 802 exists, acceleration thereof can be also calculated.

Table 2 shows necessity/unnecessity of automatic engine stop also in consideration of the acceleration of the preceding vehicle 802 in Table 1.

TABLE 2

| Preceding vehicle | Crossing vehicle | Distance between intersection and crossing vehicle | Automatic engine stop ON/OFF |
|---|---|---|---|
| Acceleration | Acceleration | Short | ON |
| | | Long | OFF |
| | Deceleration | Short | OFF |
| | | Long | OFF |
| Deceleration | Acceleration | Short | ON |
| | | Long | ON |
| | Deceleration | Short | ON |
| | | Long | OFF |

In the case where the preceding vehicle 802 is accelerating and the crossing vehicle 803 is accelerating in a place near the intersection, it is determined that the own vehicle stops to secure safety, and therefore it is possible to permit the automatic engine stop.

In the case where the preceding vehicle 802 is accelerating and the crossing vehicle 803 is accelerating in a place far from the intersection, it is determined that the own vehicle can cross the intersection after the preceding vehicle 802, and therefore it is possible to determine that the automatic engine stop is unnecessary.

In the case where the preceding vehicle 802 is accelerating and the crossing vehicle 803 is decelerating, it is determined that the own vehicle can enter the intersection without stopping, regardless a position of the crossing vehicle, and therefore it is possible to determine that the automatic engine stop is unnecessary.

In the case where the preceding vehicle 802 is decelerating and the crossing vehicle 803 is accelerating, it is determined that the own vehicle stops, regardless of the position of the crossing vehicle 803, and therefore it is possible to permit the automatic engine stop.

In the case where the preceding vehicle 802 is decelerating and the crossing vehicle 803 is decelerating in a place near the intersection, it is determined that the preceding vehicle 802 stops until the crossing vehicle 803 crosses the intersection, and therefore it is possible to permit the automatic engine stop.

In the case where the preceding vehicle 802 is decelerating and the crossing vehicle 803 is decelerating in a place far from the intersection, it is determined that the preceding vehicle 802 crosses the intersection before the crossing vehicle 803 crosses the intersection and it is also determined that the own vehicle temporarily stops and move immediately, and therefore it is possible to determine that the automatic engine stop is unnecessary.

FIG. 8 shows a flow in which own vehicle approaches an intersection, automatic engine stop of the invention is performed, and an engine is started again.

After the own vehicle approaches the intersection (Step 751), whether or not a driver operates a brake is determined (Step 752), and, when the driver operates the brake, i.e., starts to step on the brake (in the case of Yes), automatic stop determination is performed in the automatic engine stop determination unit 102 of the invention (Step 753). In the case where the brake is not operated, determination in Step 752 is repeated until the brake is stepped on. As a result of determination in the automatic engine stop determination unit 102, whether or not automatic stop of the engine is permitted is determined (Step 754), and, in the case where it is determined that the automatic stop is permitted (in the case of Yes), whether or not the driver releases the brake is then determined (Step 755). In the case where the brake is not released, i.e., the driver in the own vehicle keeps stepping on the brake (in the case of No), the automatic engine stop is continued. In the case where the driver releases the brake (in the case of Yes), the own vehicle restarts the engine (Step 756).

In the case where the preceding vehicle 802 exists as shown in FIG. 7, it is also possible to calculate a target acceleration of the own vehicle on the basis of speed of the own vehicle and an inter-vehicle distance between the own vehicle and the preceding vehicle 802 running ahead of the own vehicle and apply the target acceleration to the vehicle which performs control to follow the preceding vehicle 802 (ACC control).

Unlike the example of FIG. 1, FIG. 9 shows an example of a running control apparatus including an electronic control unit having preceding vehicle following control (ACC) which calculates target acceleration of own vehicle on the basis of speed of the own vehicle and an inter-vehicle distance between the own vehicle and the preceding vehicle running ahead of the own vehicle and follows the preceding vehicle.

In FIG. 9, the running control apparatus 100 includes not only the automatic engine stop determination unit 102 and the control manager 103 for transmitting commands to the engine control apparatus 3 and a brake control apparatus 4, but also a preceding vehicle following control unit 104. The vehicle includes the stereo camera 1 for measuring the distance between the own vehicle and the preceding vehicle, and a wheel speed sensor 2 for detecting the speed of the own vehicle, and the brake control apparatus 4 for performing deceleration operation in accordance with the target acceleration of the own vehicle calculated based on the speed of the own vehicle and the inter-vehicle distance between the own vehicle and the preceding vehicle running ahead of the own vehicle.

In the case where the preceding vehicle running ahead of the own vehicle is running toward an intersection and it is found that the acceleration of a moving object moving in a direction crossing a direction of travel of the own vehicle has a positive value, it is possible to determine that the preceding vehicle stops to wait for the moving object to pass therethrough, and therefore, in order to stop the own vehicle, it is possible to output a torque command value and a liquid pressure command value to the engine control apparatus 3 and the brake control apparatus 4, thereby stopping the vehicle.

With this, the automatic engine stop determination unit 102 can adjust an automatic engine stop time of the own vehicle so as to improve fuel efficiency on the basis of a position and the acceleration of the crossing moving object and the acceleration of the preceding vehicle.

In the invention, the description has been made assuming that the automatic engine stop necessity/unnecessity decision is performed by using a positive/negative threshold of the acceleration of the crossing vehicle or the preceding vehicle. In an actual environment, for example, the following a situation frequently occurs: the preceding vehicle or the crossing vehicle intends to stop but accelerates again to adjust a stop position.

In view of this, in the invention, the acceleration of the crossing vehicle or the preceding vehicle is not limited to a positive/negative value, and practical automatic engine stop necessity/unnecessity decision can be also implemented by setting a certain threshold (for example, an acceleration value or a deceleration value determined as heavy braking or sudden acceleration).

In the case where only the stereo camera 1 is used, an area where the crossing vehicle, the preceding vehicle, or a moving object (pedestrian, bicycle, or the like) including no light source can be recognized at night is limited to an area irradiated by a headlamp of the own vehicle. An object moving toward an intersection from a distant place can be recognized as long as it is a vehicle emitting a light source such as a headlamp. A headlamp of a crossing vehicle can be detected, a position of the crossing vehicle can be detected, and acceleration thereof is calculated, and therefore automatic engine stop necessity/unnecessity decision of the invention can be implemented. It is possible to implement automatic engine stop necessity/unnecessity determination even at night by combining in-vehicle external environment recognition devices such as a laser radar, a millimeter wave radar, and an infrared sensor in order to improve recognition accuracy.

Because the invention includes only an in-vehicle external environment recognition device such as a stereo camera, it is possible to achieve the invention without using infrastructure such as traffic signals, beacons, or cameras provided on roads, a vehicle-to-vehicle communication, or the like. Therefore, automatic engine stop necessity/unnecessity determination of the invention can exhibit its performance even in an area where infrastructure has not been developed.

Reference Signs List

| | |
|---|---|
| 1 | stereo camera |
| 2 | wheel speed sensor |
| 3 | engine control apparatus |

-continued

Reference Signs List

| | |
|---|---|
| 4 | brake control apparatus |
| 100 | running control apparatus |
| 102 | automatic engine stop determination unit |
| 103 | control manager |
| 104 | preceding vehicle following control unit |

The invention claimed is:

1. An apparatus for controlling an engine of a vehicle, the apparatus comprising:
a stereo camera that is mechanically coupled to the vehicle and configured to generate a distance image from two acquired images;
an Electronic Control Unit (ECU) that is installed in the vehicle and communicatively coupled to the stereo camera,
wherein the ECU is configured to:
acquire images of a moving object from the stereo camera, wherein the moving object is moving towards an intersection that intersects a direction of travel of the vehicle;
calculate an acceleration of the moving object with regard to the intersection based on the acquired images; and
on a condition that the acceleration calculated indicates that the moving object is accelerating towards the intersection, automatically stop the engine.

2. The apparatus according to claim 1, wherein the ECU is further configured to:
determine a distance from the moving object to the intersection based on the acquired images.

3. The apparatus according to claim 2, wherein
the acquired images include hue information.

4. The apparatus according to claim 2, wherein the ECU is further configured to:
automatically stop the engine, on a condition that the acceleration calculated indicates that the moving object is decelerating towards the intersection and the distance between the moving object and the intersection is equal to or less than a predetermined value.

5. The apparatus according to claim 4, wherein
the engine is not automatically stopped in a case where the moving object is decelerating towards the intersection and the distance between the moving object and the intersection is larger than the predetermined value.

6. The apparatus according to claim 1, wherein the ECU is further configured to:
calculate an acceleration of a preceding vehicle based on the acquired images.

7. The apparatus according to claim 6, wherein
the engine is automatically stopped in a case where the moving object is decelerating and the proceeding vehicle is decelerating.

8. The apparatus according to claim 6, wherein
the engine is not automatically stopped when the preceding vehicle is accelerating.

9. The apparatus according to claim 1, wherein the ECU is further configured to:
calculate a target acceleration of the vehicle based on a detected speed of the vehicle and an inter-vehicle distance between the vehicle and a preceding vehicle, wherein
the engine is automatically stopped based on the target acceleration, and the engine is automatically started based on the target acceleration.

10. A system for controlling an engine of a vehicle, the system comprising:
- a stereo camera that is mechanically coupled to vehicle and configured to generate a distance image from two acquired images;
- an Electronic Control Unit (ECU) that is communicatively coupled to the stereo camera, wherein the ECU is configured to:
- acquire images of a moving object from the stereo camera, wherein the moving object is moving towards an intersection that intersects a direction of travel of the vehicle,
- calculate an acceleration with regard to the intersection of the moving object based on the acquired images, and
- on a condition that the acceleration calculated indicates the moving object is accelerating towards the intersection, automatically generate a first torque command value and a first liquid pressure command value for controlling the engine and a braking system of the vehicle to stop the vehicle.

* * * * *